United States Patent [19]

Kuder et al.

[11] Patent Number: 4,634,530

[45] Date of Patent: Jan. 6, 1987

[54] CHEMICAL MODIFICATION OF PREFORMED POLYBENZIMIDAZOLE SEMIPERMEABLE MEMBRANE

[75] Inventors: James E. Kuder, Fanwood; John C. Chen, Westfield, both of N.J.

[73] Assignee: Celanese Corporation, New York, N.Y.

[21] Appl. No.: 395,648

[22] Filed: Jul. 6, 1982

Related U.S. Application Data

[63] Continuation of Ser. No. 192,150, Sep. 29, 1980, abandoned.

[51] Int. Cl.$^4$ .............................................. B01D 13/00
[52] U.S. Cl. ......................... 210/500.23; 210/500.27; 521/27
[58] Field of Search ............... 210/500.2, 638; 521/27, 521/33

[56] References Cited

U.S. PATENT DOCUMENTS 3,737,042  6/1973  Boom ........................... 210/500.2 X
3,750,735  8/1973  Chiang et al. ............... 210/500.2 X

*Primary Examiner*—Frank Spear
*Attorney, Agent, or Firm*—Burns, Doane, Swecker & Mathis

[57] ABSTRACT

A process for chemically modifying a preformed polybenzimidazole semipermeable membrane is provided. The process comprises the steps of sulfonating the membrane by contacting the membrane at a temperature within the range of 5° C. to 100° C. with a sulfonating agent and heating the membrane in an inert atmosphere at a temperature and for a period of time sufficient to convert the ionic bonds formed in the contacting step to permanent, covalent bonds, thereby providing a covalently bonded sulfonated polybenzimidazole semipermeable membrane. The membrane produced by the process of the present invention exhibits cation selectivity for electrodialysis and electrochemical applications. Other advantages may include increased water flux for reverse osmosis purposes and increased resistance to fouling.

42 Claims, No Drawings

CHEMICAL MODIFICATION OF PREFORMED POLYBENZIMIDAZOLE SEMIPERMEABLE MEMBRANE

This is a continuation of application Ser. No. 192,150, filed Sept. 29, 1980, now abandoned.

BACKGROUND OF THE INVENTION

In recent years there has been increasing interest expressed in the development of microporous membranes of a semipermeable nature which are useful in separating the components of a solution. For instance, semipermeable membranes have been looked to as a possible means to demineralize or purify otherwise unusable water and to thereby alleviate the increasing demands for potable water necessitated by the rapid growth of the population and industry in many parts of the world. Separation techniques which employ such membranes include electrodialysis, reverse osmosis, ultrafiltration, ion exchange, etc.

Electrodialysis separations employ an electrolytic cell having alternating anionic and cationic membranes that collect desalted and concentrated solutions in adjacent compartments. Such a technique can be used to purify liquids by removing ionizable impurities, to concentrate solutions of electrolytes, or to separate electrolytes from nonelectrolytes.

As opposed to the charge dependent types of separations, reverse osmosis utilizes pressure to move materials, which may be either ionic or non-ionic, selectively through a membrane. Ultrafiltration, which is very similar, uses gravity or applied pressure to effect separation using membranes which act as submicronic sieves to retain large molecules and permit the passage of small, ionic or non-ionic forms.

In the prior art, semipermeable membranes have been formed from a variety of natural and synthetic materials including polybenzimidazoles. See, for instance, commonly assigned U.S. Pat. Nos. 3,699,038; 3,720,607; 3,737,042; 3,841,492; and 3,851,025. The polybenzimidazole membranes are recognized to possess superior thermal stability when compared with other semipermeable membranes, such as those formed from cellulose acetate.

A process for chemically modifying polybenzimidazole membranes in order to increase the toughness thereof is disclosed in commonly assigned U.S. Pat. No. 4,020,142. Imidazole groups of the polybenzimidazole membrane are crosslinked by reaction with a strong polybasic acid or its acid chloride. When an acid chloride is utilized, the polybenzimidazole tends to be covalently crosslinked through an amide-type linkage; otherwise, the crosslinking tends to be ionic in nature. The process does not involve sulfonation of the membrane.

U.S. Pat. No. 3,808,305 discloses a process for chemically crosslinking ionic membranes by covalent bonds. The crosslinking is accomplished during the formation of the membrane. Polybenzimidazoles are not specifically disclosed as suitable polymers for use in the process.

Technical reports published by Celanese Research Company (ASD-TR-73-49) and Fabric Research Laboratories (AFML-TR-73-29) disclose a process for sulfonating polybenzimidazole fibers in order to reduce the thermal shrinkage thereof.

It is an object of the present invention to provide a process for chemically modifying a preformed polybenzimidazole semipermeable membrane in order to produce a covalently bonded sulfonated polybenzimidazole semipermeable membrane.

It is also an object of the present invention to provide a process for chemically modifying a preformed polybenzimidazole semipermeable membrane in order to produce a covalently bonded sulfonated polybenzimidazole semipermeable membrane which exhibits increased water flux for reverse osmosis purposes.

It is also an object of the present invention to provide a process for chemically modifying a preformed polybenzimidazole semipermeable membrane in order to produce a covalently bonded sulfonated polybenzimidazole semipermeable membrane which exhibits increased resistance to fouling.

It is also an object of the present invention to provide a process for chemically modifying a preformed polybenzimidazole semipermeable membrane in order to produce a covalently bonded sulfonated polybenzimidazole semipermeable membrane which exhibits cation selectivity for electrodialysis and other electrochemical applications.

It is also an object of the present invention to provide a covalently bonded sulfonated polybenzimidazole semipermeable membrane.

These and other objects, as well as the scope, nature, and utilization of the present invention, will be apparent from the following description and the appended claims.

SUMMARY OF THE INVENTION

A process for chemically modifying a preformed polybenzimidazole semipermeable membrane is provided. The polybenzimidazole consists essentially of recurring units of the formula

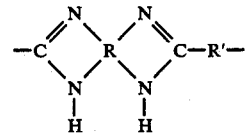

wherein R is a tetravalent aromatic nucleus, with the nitrogen atoms forming the benzimidazole rings paired upon adjacent carbon atoms of the aromatic nucleus, and R' is selected from the group consisting of an aromatic ring; an alkylene group having from 4 to 8 carbon atoms; and a heterocyclic ring selected from the group consisting of pyridine, pyrazine, furan, quinoline, thiophene, and pyran; and wherein the chemically modified membrane exhibits improved separatory capabilities, the process comprising the steps of:

(a) sulfonating the membrane by contacting the membrane at a temperature within the range of approximately 5° C. to 100° C. with a sulfonating agent selected from the group consisting of (i) sulfuric acid, (ii) a complex of $SO_3$ with a Lewis base or other organic compound, (iii) an acyl or alkyl sulfate, (iv) sulfamic acid, (v) a halosulfonic acid, (vi) an organic sulfonic acid, and (vii) mixtures of the foregoing; and (b) heating the membrane in an inert atmosphere at a temperature and for a period of time sufficient to convert the ionic bonds formed in the contacting step to permanent, covalent bonds, thereby providing a covalently bonded sulfonated polybenzimidazole semipermeable membrane.

DETAILED DESCRIPTION OF THE INVENTION

The Starting Material

Polybenzimidazoles are a known class of heterocyclic polymers. Typical polymers of this class and their preparation are more fully described in U.S. Pat. No. 2,895,948, U.S. Pat. No. Re. 26,065, and in the Journal of Polymer Science, Vol. 50, pages 511–539 (1961), which are herein incorporated by reference. The polybenzimidazoles consist essentially of recurring units of the following Formulas I and II. Formula I is:

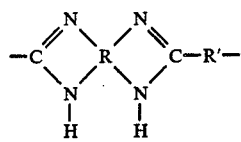

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring selected from the class consisting of (a) pyridine, (b) pyrazine, (c) furan, (d) quinoline, (e) thiophene, and (f) pyran.

Formula II is:

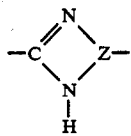

wherein Z is an aromatic nucleus having the nitrogen atoms forming the benzimidazole ring paired upon adjacent carbon atoms of the aromatic nucleus.

Preferably, aromatic polybenzimidazoles are selected, e.g., polymers consisting essentially of the recurring units of Formulas I and II wherein R' is at least one aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heterocyclic dicarboxylic acid wherein the carboxyl groups are substituents upon a carbon in a ring compound selected from the class consisting of pyridine, pyrazine, furan, quinoline, thiophene, and pyran and (c) an anhydride of an aromatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazolbenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2'-(m-phenylene)-5',5"-di(benzimidazole)propane-2,2; and
poly-2',2"-(m-phenylene)-5',5"'-di(benzimidazole)ethylene-1,2 where the double bonds of the ethylene groups are intact in the final polymer.

The preferred polybenzimidazole semipermeable membrane for use in the present process is one prepared from poly-2,2'-(m-phenylene)-5,5'-bibenzimidazole, the recurring unit of which is:

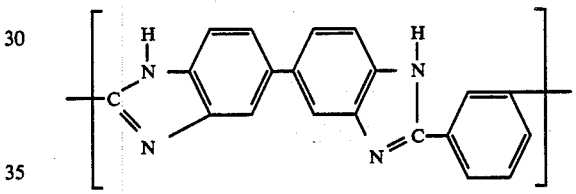

Any polymerization process known to those skilled in the art may be employed to prepare the polybenzimidazole which may then be formed into a semipermeable membrane. Representative techniques for preparing the polybenzimidazole are disclosed in U.S. Pat. Nos. 3,509,108; 3,549,603; and 3,551,389, which are assigned to the assignee of the present invention are are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 p.p.m. oxygen and preferably below about 8 p.p.m. oxygen, until a foamed prepolymer is formed having an inherent viscosity, expressed as deciliters per gram, of at least 0.1 and preferably from about 0.13 to 0.3, the inherent viscosity (I.V.) as used herein being determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350° C. to 425° C. The second stage reaction generally takes at least 0.5 hour, and preferably from about 1 to 4 hours or more.

A particularly preferred method for preparing the polybenzimidazole is disclosed in the aforesaid U.S. Pat. No. 3,509,108. As disclosed therein, aromatic polybenzimidazoles may be prepared by initially reacting the monomer in a melt phase polymerization at a temperature above about 200° C. and a pressure above 50 p.s.i. (e.g., 300 to 600 p.s.i.) and then heating the resulting reaction product in a solid state polymerization at a temperature above about 300° C. (e.g., 350° C. to 500° C.) to yield the final product.

A single-stage melt polymerization process for the production of polybenzimidazoles is disclosed in the commonly assigned U.S. patent application of E. W. Choe entitled "Single-Stage Melt Polymerization Process for the Production of High Molecular Weight Polybenzimidazole," Ser. No. 169,052, filed July 15, 1980 (now U.S. Pat. No. 4,312,976).

The polybenzimidazole semipermeable membranes which are chemically modified in accordance with the present process may be formed by any one of a variety of casting or extrusion techniques as will be apparent to those skilled in the art. Conventional membrane formation techniques may be utilized. The polybenzimidazole semipermeable membranes which serve as the starting material in the present process may assume the configuration of a film (e.g., a flat film) or the configuration of a hollow filament wherein the walls of the filament serve the role of a semipermeable membrane. Preferred techniques for forming the polybenzimidazole semipermeable membrane starting material are disclosed in U.S. Pat. Nos. 3,699,038; 3,720,607; 3,737,042; 3,841,492; and 3,851,025, which are herein incorporated by reference.

When the polybenzimidazole semipermeable membrane starting material is a film (e.g., a flat film), it commonly has a thickness of about 0.5 to 12 mils and preferably a thickness of about 1 to 5 mils.

When the polybenzimidazole semipermeable membrane starting material is a hollow filament, it commonly has an outer diameter of about 50 to 300 microns (preferably, an outer diameter of about 8 to 200 microns), and an inner diameter of about 25 to 150 microns (preferably, an inner diameter of about 40 to 70 microns). Wall thickness for the hollow filaments commonly ranges from about 20 to 160 microns, and preferably from about 40 to 60 microns. A ratio of outer diameter to inner diameter of about 1.6 to 2.4:1 is preferred. The hollow filaments are capable of withstanding applied pressures up to 1,500 p.s.i. when such ratio is about 2.0:1±0.2.

The Chemical Modification

The preformed polybenzimidazole semipermeable membrane is chemically modified to form a covalently bonded sulfonated polybenzimidazole semipermeable membrane.

According to the process of the present invention, the preformed polybenzimidazole semipermeable membrane is sulfonated by contacting the membrane with $SO_3$ or with any compound which releases $SO_3$. Suitable sulfonating agents include sulfuric acid, complexes of $SO_3$ with a Lewis base or other organic compound, and covalent compounds of the general formula $X-SO_3H$.

Preferred Lewis bases from which the $SO_3$ complexes can be formed include pyridine, trimethylamine, dioxane, triethylamine, diethylaniline, thioxane, quinoline, dimethylformamide, triethylphosphate, and N-ethylmorpholine. Other Lewis bases include 2-methylpyridine, 2,6-dimethylpyridine, dimethylaniline, N-methylmorpholine, N-butylmorpholine, dimethylacetamide, tri-n-propylamine, tri-n-butylamine, triethylamine, and N,N-dimethylbenzylamine. Additional Lewis bases include tertiary amides, ethers, and thioethers.

Miscellaneous organic $SO_3$ complexes include the complexes or pentamethylguanidine, poly(2-vinylpyridine), N-methylacetanilide, N,N-dimethyl-4-toluenesulfonamide, tetramethylurea, N,N-dimethylurethane, formylmorpholide, tetramethyladipamide, N,N-dimethylbenzamide, N-alkyl ethylene carbamates, dimethylcyanamide, trimethylphosphine oxide, diethyl ether, bis(2-chloroethyl)ether, diethyl sulfide, tetrahydrofuran, acetone, anthraquinone, polycyclic mono- and diketones (benzanthrone, benzonaphthone, etc.), 2,6-dimethyl-γ-pyrone, nitromethane, dimethyl sulfone, sulfolane, and dimethyl sulfoxide.

The covalent compounds of the general formula $X-SO_3H$ include acyl sulfates, such as acetyl sulfate, where $X=CH_3CO_2$, and the analogous compounds propionyl sulfate, butyryl sulfate, 3-methylbutyryl sulfate, and benzoyl sulfate. Also included are alkyl sulfates, such as dimethyl sulfate.

The covalent compounds also include halosulfonic acids, such as chloro-, fluoro-, and bromosulfonic acids, where X is Cl, F, and Br, respectively, chlorosulfonic acid being preferred. Also included is sulfamic acid, where $X=NH_2$. Organic sulfonic acids may also be used as sulfonating agents.

As used herein, the term "sulfonating agent" includes mixtures of the above-identified compounds and complexes.

When an asymmetric semipermeable membrane, that is, a membrane having a thin skin superimposed upon a porous support layer, is contacted with a strong sulfonating agent, such as sulfuric acid, it is possible that the strong sulfonating agent may deleteriously affect the structure of the asymmetric membrane. Therefore, it is preferred that asymmetric membranes be sulfonated by contacting such membranes with a relatively mild sulfonating agent, such as the complexes of $SO_3$ with a Lewis base or the covalent compounds of the general formula $X-SO_3H$.

The preformed polybenzimidazole semipermeable membrane is contacted with one of the sulfonating agents described above at a temperature within the range of approximately 5° C. to 100° C. The contacting temperature is preferably within the range of approximately 20° C. to 50° C., and is most preferably within the range of approximately 20° C. to 30° C.

Because the preformed membrane readily undergoes sulfonation upon contact with the sulfonating agent, the contact time may be short, e.g., approximately 30 minutes. Preferably, the membrane is contacted with the sulfonating agent for a period of time within the range of approximately 1 to 5 hours, and, more preferably, for a period of time of approximately 2 hours. Although the sulfonation reaction is essentially instantaneous, the contact times given above ensure that the reagent penetrates the interior of the membrane.

After the membrane has been contacted with the sulfonating agent, the membrane is then heated in an inert atmosphere in order to convert the ionic bonds formed during the contacting step to permanent, covalent bonds, thereby providing a covalently bonded sulfonated polybenzimidazole semipermeable membrane. The inert atmosphere may be any of a number of non-oxidizing gases, such as nitrogen, argon, etc. The inert atmosphere is preferably nitrogen.

The temperature at which the sulfonated membrane is heated can be any temperature which is sufficient to convert the ionic bonds to permanent, covalent bonds. Preferably, the membrane is heated at a temperature of at least approximately 400° C. and, more preferably, at a temperature within the range of approximately 450° C. to 510° C.

Likewise, the time for which the sulfonated membrane is heated can be any time which is sufficient, at the temperature employed, to convert the ionic bonds to permanent, covalent bonds. For example, at the preferred temperatures, a period of time of at least approximately 5 seconds is preferred. More preferably, the membrane is heated for a period of time within the range of approximately 8 to 30 seconds.

Although the chemistry involved in the process of the present invention is not completely understood at present, it is believed that the sulfonation of the membrane resulting from the contacting step produces an amidine cation, as illustrated by equation (1) below:

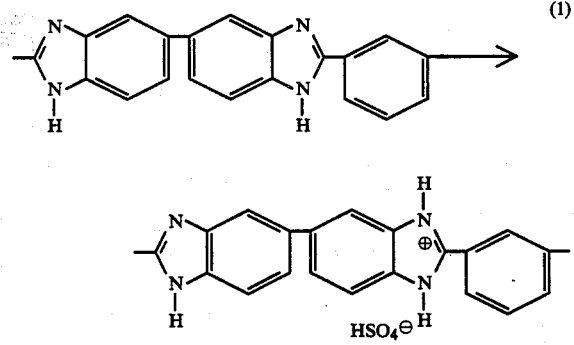

The heating of the sulfonated membrane is believed to result in the attachment of a sulfonate group to the aromatic ring, as illustrated by equation (2) below:

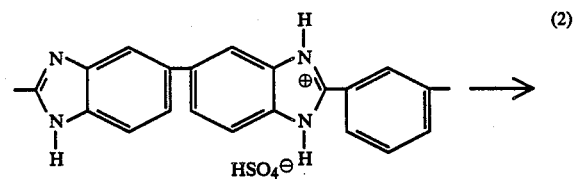

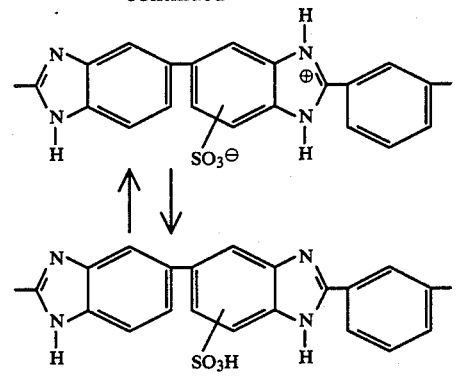

This proposed reaction sequence appears to explain the conversion during the heating step of the ionic bonds formed during the contact step to permanent, covalent bonds, thereby providing a covalently bonded sulfonated polybenzimidazole semipermeable membrane.

The conversion of the ionic bonds of Equation (1) to the covalent bonds of Equation (2) can be confirmed by infrared spectroscopy. The existence of the ionic bonds of Equation (1) is indicated by absorptions which are characteristic of the amidine cation. The conversion to covalent bonds is indicated by absorptions which are characteristic of aryl sulfonic acid or sulfonate.

The covalently bonded sulfonated polybenzimidazole semipermeable membranes produced in accordance with the process of the present invention exhibit improved separatory capabilities. For example, the sulfonated polybenzimidazole semipermeable membranes exhibit cation selectivity. Such membranes are of particular utility in electrodialysis and other electrochemical applications. The polybenzimidazole semipermeable membranes chemically modified in accordance with the process of the present invention may also exhibit increased water flux for reverse osmosis purposes. The chemically modified polybenzimidazole semipermeable membranes may also exhibit increased resistance to fouling, and hence longer lifetimes.

The separatory capabilities of the covalently bonded sulfonated polybenzimidazole semipermeable membranes prodcued in accordance with the process of the present invention can be improved still further by higher degrees of sulfonation which may be achieved by repeating the process of the present invention one or more times. However, for most purposes, a single contacting/heating sequence is sufficient to produce membranes exhibiting desirable separatory capabilities.

The following Examples are given as specific illustrations of the invention. It should be understood, however, that the invention is not limited to the specific details set forth in the Examples.

EXAMPLE 1

A polybenzimidazole was prepared according to the process disclosed by A. B. Conciatori, et al, in *J. Polymer Sci., Part C,* No. 19, pp. 49–64 (1967), which is herein incorporated by reference. Stoichiometric quantities of 3,3-diaminobenzidine and diphenylisophthalate were charged to a stirred reactor. The reactants were heated under nitrogen at 290° C. for 1.5 hours. When the mass became viscous, stirring was discontinued and the polymer was allowed to foam. The voluminous foam, which was a prepolymer having an inherent viscosity of 0.24 dl./g. when measured at a concentration of 0.4 g. of polymer in 100 ml. of 97 percent sulfuric acid, was pulverized and charged into a second reactor where it was heated in a nitrogen stream to 385° C. over a period of 3 hours.

A semipermeable membrane in the form of a film was then prepared. A dope of 18 percent by weight of the polybenzimidazole prepared as described above and 1.2 percent by weight of lithium chloride in dimethylacetamide was cast onto a thoroughly cleaned glass plate using a Gardner blade having a width of 6 inches and set to deliver a thickness of 4 mils. The cast dope was allowed to dry under ambient conditions for not less than 5 minutes and then dried at 160° C. for one hour in a vented oven. After cooling to room temperature, the plate was placed in a tray of warm water. The polybenzimidazole film was readily removed from the plate and dried between filter paper.

The polybenzimidazole film thus prepared was placed in a rectangular clamped metal frame. The supported film was immersed in 2.5 weight percent $H_2SO_4$ at 50° C. for 2 hours. The film was then rinsed in water and wiped dry to remove water droplets. The film in its metal frame was then placed in an oven at 450° C. for 30 seconds.

Examination of the sulfonated film indicated that it had undergone sulfonation to the extent of 7.75 percent S or 19.4 percent $SO_3$, which corresponds to 0.93 sulfonic acid group per polybenzimidazole repeat unit. This indicates that the sulfonation is essentially complete.

The permselectivity of the sulfonated membrane was measured using a standard procedure as described in "Test Manual (Tentative) for Permselective Membranes," R & D Progress Report No. 77 (January, 1964), Office of Saline Water, U.S. Department of the Interior, which is herein incorporated by reference. The film was clamped between two halves of a Lucite cell and electrolyte solutions of two different concentrations (0.2M and 0.1M KCl solutions) were allowed to flow continuously past either side of the membrane. The concentration potential across the membrane was measured between two calomel electrodes and is given by $$E_m = (t_- - t_+) \frac{RT}{F} \ln(a_2/a_1)$$

$$= (2t_+ - 1) \frac{RT}{F} \ln(a_2/a_1)$$

where R is the gas constant (8.314 joule/°K.-mole), T is the temperature (°K.), F is the Faraday constant (96,487 coulomb/equiv.), $t_-$ and $t_+$ are the anion and cation transport numbers in the membrane, respectively, and $a_2$ and $a_1$ are the activities of the electrolyte on either side of the membrane. Cation permselectivity is given by the quantity $(2t_+ - 1) \times 100\%$.

In the present Example the values of the cation transport number and cation permselectivity were found to be 0.91 and 82.5 percent, respectively. A completely ion selective membrane will have a cation transport number of 1.0 and a permselectivity of 100 percent. For a membrane having no ion selectivity, the values are 0.5 and 0 percent, respectively.

Thus, the membrane of the present Example demonstrates satisfactory ion selectivity at the relatively low electrolyte concentrations employed.

EXAMPLE 2

A covalently bonded sulfonated polybenzimidazole semipermeable membrane was prepared in the manner described in Example 1 except that, after contact with 2.5 weight percent $H_2SO_4$, the film was heated at 450° C. for 60 seconds.

Again, the sulfonation was essentially complete. The film had been sulfonated to the extent of 7.75 percent S or 19.4 percent $SO_3$, corresponding to 0.93 sulfonic acid group per polybenzimidazole repeat unit.

The permeability of the membrane was measured as described in Example 1. The values of the cation transport number and cation permselectivity were found to be 0.85 and 70.2 percent, respectively. The membrane of the present Example thus demonstrates satisfactory ion selectivity.

EXAMPLE 3

A polybenzimidazole semipermeable membrane was prepared from the dope described in Example 1. A 3-roll reverse roll coater having a width of 20 inches was used to lay down a coating having a thickness of 4 mils on a Celanar ® polyethylene terephthalate web at a web speed of 5 ft./min. The web was then passed through two chambers of a hot air impingement drier at 93° C. with a residence time of 3.2 minutes. The dried film was then passed into a water bath whereupon the polybenzimidazole fiber separated from the polyethylene terephthalate web. The film was air dried on a circular frame.

The film was sulfonated in the manner described in Example 1 with the exception that the contacting/heating sequence was repeated once. Examination of the sulfonated film indicated that it contained, on the average, about 2 sulfonic acid groups per polybenzimidazole repeat unit.

The permselectivity of the membrane was measured as described in Example 1. The values of the cation transport number and cation permselectivity were found to be 0.85 and 70 percent, respectively. The membrane of the present Example thus demonstrates satisfactory ion selectivity.

Although the invention has been described with preferred embodiments, it is to be understood that variations and modifications may be employed as will be apparent to those skilled in the art. Such variations and modifications are to be considered within the purview and scope of the claims appended hereto.

We claim:

1. A process for chemically modifying a preformed polybenzimidazole semipermeable membrane wherein said polybenzimidazole consists essentially of recurring units of the formula

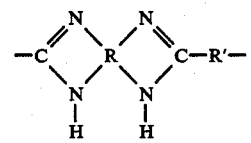

wherein R is a tetravalent aromatic nucleus, with the nitrogen atoms forming the benzimidazole rings paired upon adjacent carbon atoms of said aromatic nucleus, and R' is selected from the group consisting of an aromatic ring; an alkylene group having from 4 to 8 carbon atoms; and a heterocyclic ring selected from the group consisting of pyridine, pyrazine, furan, quinoline, thiophene, and pyran; and wherein the chemically modified membrane exhibits improved separatory capabilities, said process comprising the steps of:

(a) sulfonating said membrane with the formation of ionic bonds by contacting said membrane at a temperature within the range of approximately 5° C. to 100° C. with a sulfonating agent selected from the group consisting of (i) sulfuric acid, (ii) a complex of $SO_3$ with a Lewis base or other organic compound, (iii) an acyl or alkyl sulfate, (iv) sulfamic acid, (v) a halosulfonic acid, (vi) an organic sulfonic acid, and (vii) mixtures of the foregoing; and (b) heating said membrane in an inert atmosphere at a temperature and for a period of time sufficient to convert the ionic bonds formed in the sulfonating step (a) to permanent, covalent bonds, thereby providing a covalently bonded sulfonated polybenzimidazole semipermeable membrane.

2. The process of claim 1 wherein said membrane is contacted with said sulfonating agent at a temperature within the range of approximately 20° C. to 50° C.

3. The process of claim 1 wherein said sulfonating agent is sulfuric acid.

4. The process of claim 1 wherein said sulfonating agent is a complex of $SO_3$ with a Lewis base.

5. The process of claim 4 wherein said Lewis base is selected from the group consisting of pyridine, trimethylamine, dioxane, triethylamine, diethylaniline, thioxane, quinoline, dimethylformamide, triethylphosphate, and N-ethylmorpholine.

6. The process of claim 1 wherein said sulfonating agent is acetyl sulfate.

7. The process of claim 1 wherein said sulfonating agent is sulfamic acid.

8. The process of claim 1 wherein said sulfonating agent is a halosulfonic acid.

9. The process of claim 8 wherein said sulfonating agent is chlorosulfonic acid.

10. The process of claim 1 wherein said polybenzimidazole is poly-2,2'-(m-phenylene)-5,5'-bibenzimidazole.

11. The process of claim 1 wherein said preformed polybenzimidazole semipermeable membrane is in the form of a film.

12. The process of claim 1 wherein said preformed polybenzimidazole semipermeable membrane is in the form of hollow fibers.

13. The process of claim 1 wherein said inert atmosphere of heating step (b) is a nitrogen atmosphere.

14. The process of claim 1 wherein said membrane is heated during heating step (b) at a temperature of at least approximately 400° C.

15. The process of claim 1 wherein said membrane is heated during heating step (b) for a period of time of at least approximately 5 seconds.

16. The covalently bonded sulfonated polybenzimidazole semipermeable membrane produced by the process of claim 1.

17. A process for chemically modifying a preformed polybenzimidazole semipermeable membrane wherein said polybenzimidazole consists essentially of recurring units of the formula

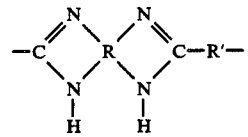

wherein R is a tetravalent aromatic nucleus, with the nitrogen atoms forming the benzimidazole rings paired upon adjacent carbon atoms of said aromatic nucleus, and R' is selected from the group consisting of an aromatic ring; an alkylene group having from 4 to 8 carbons atoms; and a heterocyclic ring selected from the group consisting of pyridine, pyrazine, furan, quinoline, thiophene, and pyran; and wherein the chemically modified membrane exhibits improved separatory capabilities, said process comprising the steps of:

(a) sulfonating said membrane with the formation of ionic bonds by contacting said membrane at a temperature within the range of approximately 20° C. to 50° C. with a sulfonating agent selected from the group consisting of (i) sulfuric acid, (ii) a complex of $SO_3$ with a Lewis base, (iii) acetyl sulfate, (iv) sulfamic acid, and (v) chlorosulfonic acid, and (vi) mixtures of the foregoing; and (b) heating said membrane in an inert atmosphere at a temperature of at least approximately 400° C. for a period of time of at least 5 seconds in order to convert the ionic bonds formed in the sulfonating step (a) to permanent, covalent bonds, thereby providing a covalently bonded sulfonated polybenzimidazole semipermeable membrane.

18. The process of claim 17 wherein said membrane is contacted with said sulfonating agent at a temperature within the range of approximately 20° C. to 30° C.

19. The process of claim 17 wherein said sulfonating agent is sulfuric acid.

20. The process of claim 17 wherein said sulfonating agent is a complex of $SO_3$ with a Lewis base.

21. The process of claim 20 wherein said Lewis base is selected from the group consisting of pyridine, trimethylamine, dioxane, triethylamine, diethylaniline, thioxane, quinoline, dimethylformamide, triethylphosphate, and N-ethylmorpholine.

22. The process of claim 17 wherein said sulfonating agent is acetyl sulfate.

23. The process of claim 17 wherein said sulfonating agent is sulfamic acid.

24. The process of claim 17 wherein said sulfonating agent is chlorosulfonic acid.

25. The process of claim 17 wherein said inert atmosphere of heating step (b) is a nitrogen atmosphere.

26. The process of claim 17 wherein said membrane is heated during heating step (b) at a temperature within the range of approximately 450° C. to 510° C.

27. The process of claim 17 wherein said membrane is heated during heating step (b) for a period of time of approximately 8 to 30 seconds.

28. The process of claim 17 wherein said polybenzimidazole is poly-2,2'-(m-phenylene)-5,5'-bibenzimidazole.

29. A covalently bonded sulfonated polybenzimidazole semipermeable membrane produced in accordance with the process of claim 17.

30. A process for chemically modifying a preformed polybenzimidazole semipermeable membrane wherein said polybenzimidazole consists essentially of recurring units of the formula

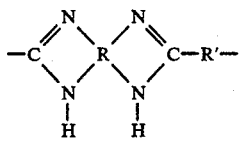

wherein R is a tetravalent aromatic nucleus, with the nitrogen atoms forming the benzimidazole rings paired upon adjacent carbon atoms of said aromatic nucleus, and R' is selected from the group consisting of an aromatic ring; an alkylene group having from 4 to 8 carbon atoms; and a heterocyclic ring selected from the group consisting of pyridine, pyrazine, furan, quinoline, thiophene, and pyran; and wherein the chemically modified membrane exhibits improved separatory capabilities, said process comprising the steps of:
(a) sulfonating said membrane with the formation of ionic bonds by contacting said membrane at a temperature within the range of approximately 20° C. to 30° C. with a sulfonating agent selected from the group consisting of (i) sulfuric acid, (ii) a complex of $SO_3$ with a Lewis base, (iii) acetyl sulfate, (iv) sulfamic acid, and (v) chlorosulfonic acid, and (vi) mixtures of the foregoing; and
(b) heating said membrane in an inert atmosphere at a temperature within the range of approximately 450° C. to 510° C. for a period of time within the range of approximately 8 to 30 seconds in order to convert the ionic bonds formed in the sulfonating step (a) to permanent, covalent bonds, thereby providing a covalently bonded sulfonated polybenzimidazole semipermeable membrane.

31. The process of claim 30 wherein said sulfonating agent is sulfuric acid.

32. The process of claim 30 wherein said sulfonating agent is a complex of $SO_3$ with a Lewis base.

33. The process of claim 32 wherein said Lewis base is selected from the group consisting of pyridine, trimethylamine, dioxane, triethylamine, diethylaniline, thioxane, quinoline, dimethylformamide, triethylphosphate, and N-ethylmorpholine.

34. The process of claim 30 wherein said sulfonating agent is acetyl sulfate.

35. The process of claim 30 wherein said sulfonating agent is sulfamic acid.

36. The process of claim 30 wherein said sulfonating agent is chlorosulfonic acid.

37. The process of claim 30 wherein said polybenzimidazole is poly-2,2'-(m-phenylene)-5,5'-bibenzimidazole.

38. A covalently bonded sulfonated polybenzimidazole semipermeable membrane produced by the process of claim 31.

39. A covalently bonded sulfonated polybenzimidazole semipermeable membrane produced by the process of claim 32.

40. A covalently bonded sulfonated polybenzimidazole semipermeable membrane produced by the process of claim 34.

41. A covalently bonded sulfonated polybenzimidazole semipermeable membrane produced by the process of claim 35.

42. A covalently bonded sulfonated polybenzimidazole semipermeable membrane produced by the process of claim 36.

* * * * *